Nov. 10, 1953 O. T. HALLUM 2,658,477
AUTOMATIC LIVESTOCK FEEDER
Filed Jan. 9, 1950 2 Sheets-Sheet 1
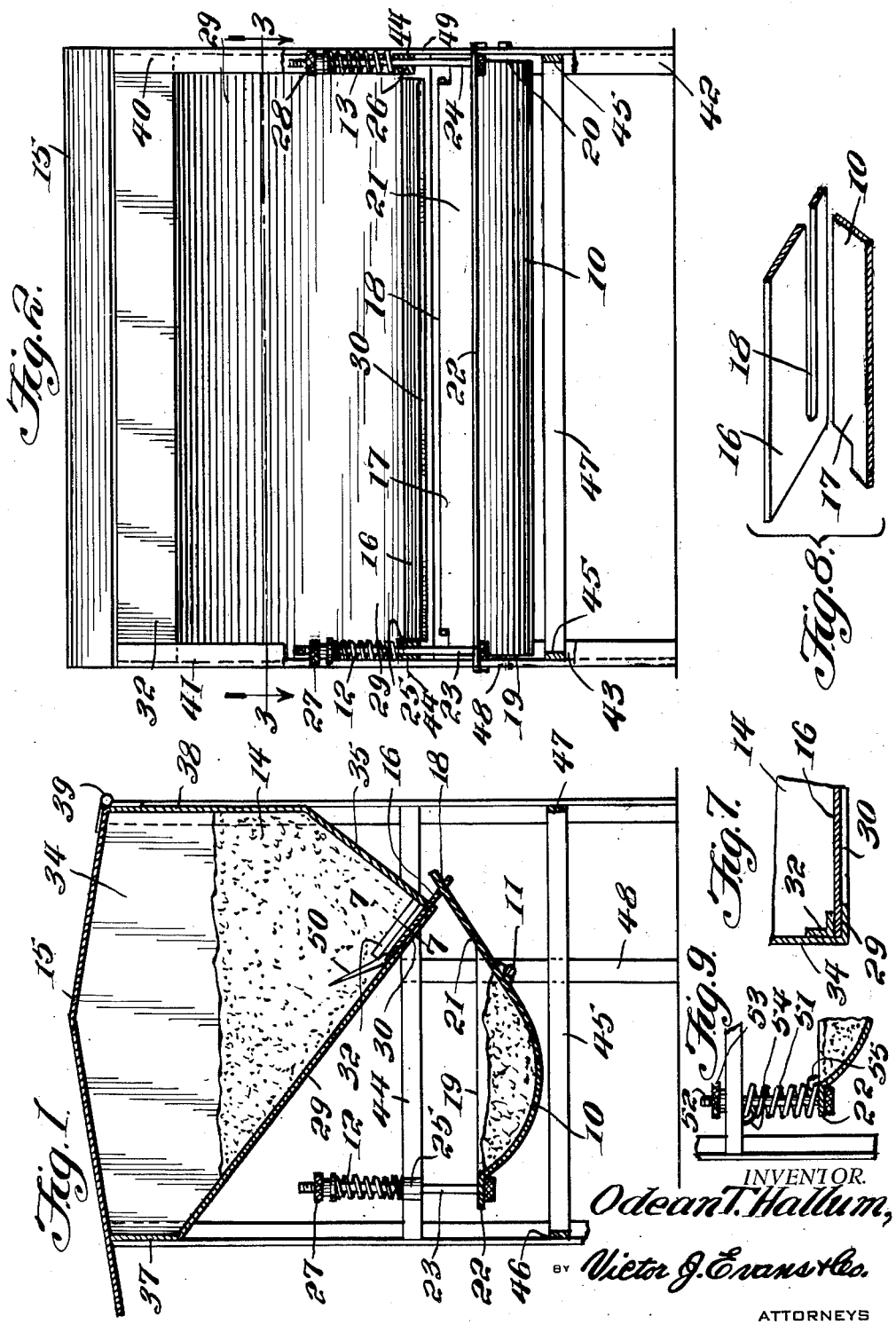
INVENTOR.
Odean T. Hallum,
BY Victor J. Evans & Co.
ATTORNEYS

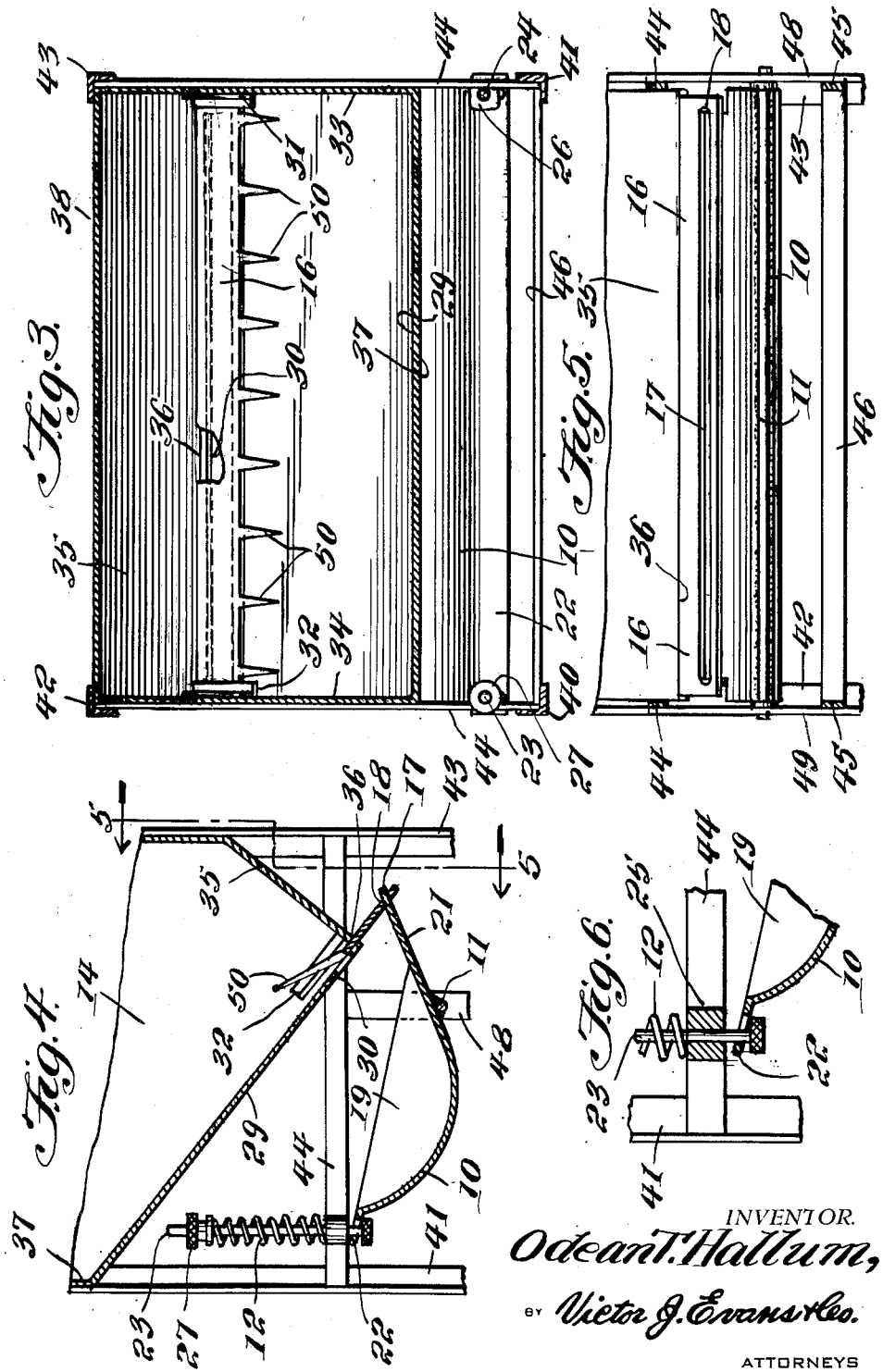

Patented Nov. 10, 1953

2,658,477

UNITED STATES PATENT OFFICE 2,658,477

AUTOMATIC LIVESTOCK FEEDER

Odean T. Hallum, Denver, Colo.

Application January 9, 1950, Serial No. 137,582

1 Claim. (Cl. 119—57)

This invention relates to feeding troughs for hogs, and other livestock of the type having a storage bin in combination with a feeding trough, and in particular a frame having a feeding trough pivotally mounted below an outlet opening of a storage bin with a gate positioned to open and close the outlet opening of the storage bin and wherein the gate is actuated by the feeding trough whereby with the trough full of feed or the like the gate is closed and when the feed is removed from the trough the gate is opened by the trough.

The purpose of this invention is to provide a feeder for livestock and the like in which a supply of feed may be stored above a feeding trough and dropped into the trough only as it is used.

In the usual type of feeding trough the feed in position for use is exposed to the elements and is not only subjected to dirt and the like kicked or stirred up by the animals but often becomes moist and is, therefore, damaged. With this thought in mind this invention contemplates a feeding trough that is covered by a storage bin so that food exposed in the trough is protected from the elements and also from dirt and the like and the food in the storage bin is definitely protected from dust, dirt and the like.

The object of this invention is, therefore, to provide means for forming a feeder for livestock and the like whereby feed, mineral, or the like is dropped in small quantities into a feeding trough with the feeding trough positioned below and protected by a storage bin and wherein feed from the bin is supplied to the trough only as it is used.

Another object of the invention is to provide an improved livestock feeding trough that may readily be adjusted to supply large or small quantities of feed or feed at regular intervals, as may be desired.

A further object of the invention is to provide an automatically actuated protected feeding trough which is of a simple and economical construction.

Other features and advantages of the invention will appear from the following description taken in connection with the drawings wherein:

Figure 1 is a cross section through the feeding trough and storage bin showing the trough in the position in which it is filled with mineral or other food.

Figure 2 is a front elevational view looking toward the open side of the trough with the elements positioned as shown in Figure 1.

Figure 3 is a sectional plan taken on line 3—3 of Figure 2 looking downwardly through the storage bin of the feeder.

Figure 4 is a detail showing a section similar to that shown in Figure 1 with parts broken away and with the feeding trough in the position to which it is actuated by springs when food is removed therefrom.

Figure 5 is a rear elevational view taken on line 5—5 of Figure 4 showing the connections between the feeding trough and gate.

Figure 6 is an enlarged detail illustrating the connection between the outer edge of the feeding trough and one of the springs by which the trough is resiliently held.

Figure 7 is an enlarged detail showing a section taken on line 7—7 of Figure 1 showing the gate and track in which the edges of the gate are held.

Figure 8 is an enlarged exploded detail illustrating the position of a tongue on the rear edge of the trough in relation to the slot in the gate through which the tongue extends.

Figure 9 is a detail illustrating a modification wherein a tension spring is used for supporting the outer edge of the feed hopper.

Referring now to the drawings wherein like reference characters denote corresponding parts the improved automatic feeder of this invention includes a trough 10 pivotally mounted on a shaft 11 and resiliently held upwardly by springs 12 and 13, a bin 14 with a cover 15 providing a closure for the upper end, and a gate 16 slidably mounted in the lower end of the bin and actuated by a tongue 17 extended from the rear edge of the trough 10 and positioned in a slot 18 in the gate.

The trough 10 is formed with an arcuate lower feeding section having end walls 19 and 20 with a rearwardly extended baffle 21 through which the trough is pivotally mounted on the shaft 11 and on the outer edge of which the tongue 17 is provided. The opposite edge of the trough is provided with a flange 22 in which bolts 23 and 24 are positioned and the springs 12 and 13 are positioned around the upwardly extended ends of the bolts. The bolts are slidably mounted in bearings 25 and 26 and thumb nuts 27 and 28 are provided on the upwardly extended threaded ends, through which the tension on the springs may be adjusted to regulate the amount of food dropped into the trough 10 when the gate 16 is open.

The bin 14 is provided with a sloping bottom 29 and the bottom is provided with an elongated opening 30 that may be closed by the gate 16 which is slidably mounted on the bottom and held in position by clip angles 31 and 32 that are mounted on the ends 33 and 34, respectively. A sloping section 35 is provided in the rear portion of the bin to guide products in the bin toward the slot 30 and the lower edge of the section 35 is provided with a slot 36 through which the gate 16 extends, as shown in Figure 1. The bin is also provided with a front wall 37 and a rear wall 38 and the cover 15, the edge of which projects beyond the front wall 37, is pivotally connected to the rear wall 38 and the cover 15, the edge of which projects beyond the front wall 37, is pivotally connected to the rear wall 38 by a hinge 39.

The bin 14 and the hopper 10 are supported by a frame having posts 40 and 41 at the front, and 42 and 43 at the rear and the posts are connected by cross braces 44 and 45 at the ends, 46 at the front and 47 at the rear. A vertical bar 48 is also provided at one end and a similar bar 49 is provided at the other and these bars are provided with openings in which the ends of the shaft 11 are journaled.

With the parts arranged in this manner, grain, pellets, minerals, or other products may be placed in the bin 14 by raising the cover 15 and with the trough 10 empty it will be elevated to the position shown in Figure 4 by the springs 12 and 13 whereby the rear edge of the trough opens the gate 16 so that products from the bin pass into the trough. As the trough is filled with a sufficient quantity of the product to provide a feeding for livestock the weight of the product causes the trough to drop downwardly whereby the rear edge actuates the tongue 17 to move the gate 16 inwardly, thereby closing the slots 30 until the product positioned in the trough is exhausted. The quantity of the material deposited into the feeding trough is regulated by the thumb nuts 27 and 28 whereby substantially any quantity desired may be placed in the trough.

The plate 16 is, therefore, continuously reciprocated with a sliding movement and points 50 on the inner edge thereof provide agitators loosening up material, particularly where minerals are used in the lower part of the hopper to facilitate feeding thereof.

The tension or contracting type of spring as indicated by the numeral 51 may be used on the outer edge 22 of the hopper as illustrated in Figure 9, with bolts 52 having thumb nuts 53 thereon extended through the springs and supporting the parts from the members 44. The upper ends of the springs are attached to the supporting members at the points 54 and the lower ends are attached to the hopper at the points 55.

It will be understood that modifications may be made in the design and arrangement of the parts without departing from the spirit of the invention.

What is claimed is:

An automatic livestock feeder comprising a frame including a plurality of spaced parallel vertically disposed posts, cross braces extending between said posts and connectced thereto, a pair of vertically disposed spaced parallel bars arranged at the ends of said frame, a horizontally disposed shaft journaled in said bars, a bin supported by said frame and including a sloping bottom provided with an elongated opening, a gate slidably mounted in the bottom of said bin and mounted for movement into and out of closing relation with respect to said opening, clip angles for guiding said gate, the rear portion of said bin being provided with a guiding sloping section having a slot therein for slidably receiving said gate, a cover hingedly mounted on said bin and having its front end extending forwardly of said bin, a trough positioned below said bin and provided with an arcuate lower feeding section, spaced parallel end walls extending upwardly from said arcuate section, a baffle extending rearwardly from said trough and pivotally mounted on said shaft, a tongue extending from said baffle and connected to said gate, a flange extending forwardly from said trough, bolts connected to said flange, bearings mounted on said frame for slidably receiving said bolts, coil springs circumposed on said bolts, thumb nuts adjustably mounted on the upper ends of said bolts for adjusting the tension of said coil springs, and a plurality of points on the inner edge of said gate for agitating the material in said bin.

ODEAN T. HALLUM.

References Cited in the file of this patent

UNITED STATES PATENTS

| Number | Name | Date |
|---|---|---|
| 434,723 | Richards | Aug. 19, 1890 |
| 772,121 | Anderson | Oct. 11, 1904 |
| 1,449,485 | Alspach | Mar. 27, 1923 |
| 1,587,775 | Higgins | June 8, 1926 |
| 1,849,908 | Clutter | Mar. 15, 1932 |
| 2,322,171 | Spatz | June 15, 1943 |
| 2,408,477 | Payne | Oct. 1, 1946 |
| 2,441,959 | Doty | May 25, 1948 |
| 2,485,173 | Smucker | Oct. 18, 1949 |